United States Patent
Capobianco et al.

(10) Patent No.: US 12,178,353 B2
(45) Date of Patent: Dec. 31, 2024

(54) REMOTELY ENABLED AND LOCALLY CONTROLLED USE OF LIQUID MILK IN THE PREPARATION OF HOT AND COLD BEVERAGES BASED ON, OR CONTAINING, LIQUID MILK IN AUTOMATIC BEVERAGE PREPARATION MACHINES OR IN BEVERAGE VENDING MACHINES

(71) Applicant: EVOCA S.P.A., Milan (IT)

(72) Inventors: Alberto Capobianco, Milan (IT);
Alessandro Magno, Milan (IT);
Samuel Van Den Driessche, Milan (IT)

(73) Assignee: EVOCA S.P.A., Milan (IT)

(*) Notice: Subject to any disclaimer, the term of this patent is extended or adjusted under 35 U.S.C. 154(b) by 907 days.

(21) Appl. No.: 17/289,478

(22) PCT Filed: Oct. 18, 2019

(86) PCT No.: PCT/IB2019/058917
§ 371 (c)(1),
(2) Date: Apr. 28, 2021

(87) PCT Pub. No.: WO2020/089723
PCT Pub. Date: May 7, 2020

(65) Prior Publication Data
US 2021/0393072 A1   Dec. 23, 2021

(30) Foreign Application Priority Data

Oct. 30, 2018 (EP) .................................. 18203554
Jul. 12, 2019 (IT) ......................... 102019000011541

(51) Int. Cl.
*A47J 31/41* (2006.01)
*A47J 31/44* (2006.01)
(Continued)

(52) U.S. Cl.
CPC ........... *A47J 31/41* (2013.01); *A47J 31/4485* (2013.01); *A47J 31/521* (2018.08); *B67D 1/0004* (2013.01);
(Continued)

(58) Field of Classification Search
CPC ...... A47J 31/41; A47J 31/4485; A47J 31/521; A47J 31/4403; A47J 31/40; B67D 1/0004;
(Continued)

(56) References Cited

U.S. PATENT DOCUMENTS 7,032,818 B2 * 4/2006 Thomas ................. G06K 17/00
235/462.46
7,387,239 B2 * 6/2008 Thomas ............... B67D 1/0884
235/462.46
(Continued)

FOREIGN PATENT DOCUMENTS

EP   2345352 A1   7/2011
EP   3340195 A1   6/2018
(Continued)

OTHER PUBLICATIONS

International Search Report and Written Opinion from International Application No. PCT/IB2019/058917 mailed Jan. 22, 2020.
(Continued)

*Primary Examiner* — Michael Collins
(74) *Attorney, Agent, or Firm* — Dorse & Whitney LLP (57) ABSTRACT

An electronic system to remotely enable and locally control use of liquid milk in the preparation of beverages based on, or containing, liquid milk in beverage vending machines is disclosed.

13 Claims, 1 Drawing Sheet

(51) Int. Cl.
*A47J 31/52* (2006.01)
*B67D 1/00* (2006.01)
*B67D 1/08* (2006.01)
*G06F 7/08* (2006.01)
*G06Q 20/18* (2012.01)
*G06Q 20/32* (2012.01)
*G07F 9/00* (2006.01)
*G07F 9/02* (2006.01)
*G07F 13/06* (2006.01)
*G07F 13/10* (2006.01)

(52) U.S. Cl.
CPC ............... *G06F 7/08* (2013.01); *G06Q 20/18* (2013.01); *G06Q 20/3274* (2013.01); *G07F 9/001* (2020.05); *G07F 9/002* (2020.05); *G07F 9/026* (2013.01); *G07F 13/06* (2013.01); *G07F 13/10* (2013.01); *B67D 1/0888* (2013.01)

(58) Field of Classification Search
CPC ........... B67D 1/0888; B67D 1/08; G06F 7/08; G06Q 20/18; G06Q 20/3274; G07F 9/001; G07F 9/002; G07F 9/026; G07F 13/06; G07F 13/10; G07F 13/025; G07F 13/065; G07G 1/009
See application file for complete search history.

(56) References Cited

U.S. PATENT DOCUMENTS

| | | | |
|---|---|---|---|
| 9,334,150 B1 | 5/2016 | Ost et al. | |
| 2003/0006281 A1* | 1/2003 | Thomas | G06Q 20/203 705/28 |
| 2009/0069949 A1* | 3/2009 | Carpenter | B67D 1/0878 222/144.5 |
| 2009/0293733 A1* | 12/2009 | Martin | A47J 31/60 99/280 |
| 2016/0257554 A1 | 9/2016 | Manwani et al. | |
| 2016/0309949 A1* | 10/2016 | Standaar | A47J 31/525 |
| 2017/0011221 A1* | 1/2017 | Green | G06Q 30/06 |
| 2019/0208798 A1* | 7/2019 | Voges | A23F 5/04 |
| 2019/0272068 A1* | 9/2019 | Newman | G06F 3/03547 |
| 2019/0282025 A1* | 9/2019 | Standaar | A47J 31/4492 |

FOREIGN PATENT DOCUMENTS

| | | |
|---|---|---|
| WO | 03005295 A1 | 1/2003 |
| WO | 03015039 A2 | 2/2003 |
| WO | 2008004144 A2 | 1/2008 |
| WO | 2013011078 A1 | 1/2013 |
| WO | 2013160318 A1 | 10/2013 |
| WO | 2015153565 A1 | 10/2015 |
| WO | 2018049195 A1 | 3/2018 |

OTHER PUBLICATIONS

PCT Notification of Transmittal of the International Preliminary Report on Patentability mailed Jan. 15, 2021.
Second Written Opinion from International Application No. PCT/IB2019/058917 mailed Oct. 21, 2020.
Istocka, et al., "Automated Beverage Dispenser", URL:https://ideaexchange.uakron.edu/cgi/viewcontent.cgi?article=1088&context=honors_research-projects, XP055657578, retrieved from the internet Jan. 1, 2015, Apr. 7, 2015, pp. 1-53.

* cited by examiner

REMOTELY ENABLED AND LOCALLY CONTROLLED USE OF LIQUID MILK IN THE PREPARATION OF HOT AND COLD BEVERAGES BASED ON, OR CONTAINING, LIQUID MILK IN AUTOMATIC BEVERAGE PREPARATION MACHINES OR IN BEVERAGE VENDING MACHINES

CROSS-REFERENCE TO RELATED PATENT APPLICATIONS

This patent application is a U.S. National Stage of PCT International Application No. PCT/IB2019/058917 filed on 18 Oct. 2019, which claims priority to European Patent Application No. 18203554.3 filed on 30 Oct. 2018 and Italian Patent Application No. 102019000011541 filed on 12 Jul. 2019, the contents of which are incorporated herein by reference in their entirety.

TECHNICAL FIELD OF THE INVENTION

The present invention is generally related to table-top automatic beverage preparation machines and to free standing beverage vending machines, and, in particular, to the remotely enabled and locally controlled use of liquid milk as an ingredient in the preparation of hot and cold beverages based on, or containing, liquid milk in beverage vending machines of the type described above.

BACKGROUND

As is well known, some types of table-top automatic beverage preparation machines and free standing beverage vending machines are capable of instantly preparing and dispensing hot and cold beverages mainly based on liquid milk, such as hot milk and "latte macchiato", and hot beverages produced by brewing brewable substances with pressurized hot water, such as coffee- and tea-based beverages containing liquid milk that may be hot or cold, frothed or smooth, such as espresso macchiato, cappuccino, etc.

In these automatic beverage preparation machines and beverage vending machines, the liquid milk is contained in disposable containers, for example of the so-called bag-in-box type, and is stored at a certain temperature, for example 5° C., in refrigerators in the automatic beverage preparation machines and beverage vending machines.

The liquid milk is taken from the containers, by means of a pump, in quantities appropriate for the beverages being prepared, and fed to milk frothing and heating assemblies, in which, depending on the need, the liquid milk may be mixed with air, to froth it, and/or with steam, to heat it to a desired temperature.

Normally, the free standing beverage vending machines, and sometimes even the table top automatic beverage preparation machines, are generally unattended, so the correct storage of liquid milk, and its correct use in compliance with food safety regulations, is evidently a matter of paramount importance for manufacturers of beverage vending machines.

To ensure the correct storage and use of products to be consumed by an expiry date or use-by date, WO 03/005295 A1 and WO 03/015039 A2 disclose systems for monitoring expiration or use of products and preventing the products from being delivered beyond the expiry or use-by date based on the use of tags to be associated with the product containers and containing information on the expiry or use-by date of the products.

SUBJECT AND SUMMARY OF THE INVENTION

The Applicant has verified that the above-mentioned systems for monitoring expiry or use of products and for preventing the products from being delivered beyond the expiry or use-by dates, although satisfactory in many respects, have considerable room for improvement at least in terms of combating fraud in the sale of products that fail to comply with current regulations.

The purpose of the present invention is to provide an electronic system for remotely managing use of liquid milk as an ingredient in the preparation of hot and cold beverages based on, or containing, liquid milk in automatic beverage preparation machines and beverage vending machines, which electronic system allows the known systems to be improved at least in terms of combating fraud in the sale of liquid milk that fails to comply with current regulations.

According to the present invention, an electronic system for remotely managing use of liquid milk as an ingredient in the preparation of hot and cold beverages based on or containing, liquid milk in automatic beverage preparation machines and beverage vending machines is provided, as claimed in the appended claims.

BRIEF DESCRIPTION OF THE DRAWINGS

Attached FIGURE schematically shows an electronic system for remotely managing use of liquid milk as an ingredient in the preparation of hot and cold beverages based on, or containing, liquid milk in automatic beverage preparation machines and beverage vending machines according to a preferred embodiment of the invention.

DETAILED DESCRIPTION OF PREFERRED EMBODIMENTS OF THE INVENTION

The present innovation will now be described in detail with reference to the attached FIGURES in order to allow a skilled person to produce and use it. Various modifications to the described embodiments will be readily apparent to skilled persons and the generic principles described may be applied to other embodiments and applications without departing from the present invention's scope of protection, as defined in the attached claims. Therefore, the present innovation should not be regarded as limited to the embodiments described and shown herein, but should be allowed the broadest scope of protection consistent with the features described and claimed herein.

Unless otherwise defined, all technical and scientific terms used herein have the same meaning commonly understood by persons of ordinary skill in the art relevant to the present invention. In case of conflict, the present description, comprising the definitions provided, will be binding. Furthermore, the examples are provided for illustrative purposes only and, as such, should not be considered limiting.

In particular, the block diagrams in the attached FIGURE and described below are not to be understood as a representation of the structural features, i.e. construction restrictions, but must be understood as a representation of functional features, i.e. intrinsic properties of the devices defined by the effects obtained, that is to say functional restrictions, which can be implemented in different ways, so as to protect the functionalities thereof (operational capability).

In order to facilitate the understanding of the embodiments described herein, reference will be made to some specific embodiments and a specific language be used to describe the same. The terminology used herein is used for the purpose of describing particular embodiments only, and is not intended to limit the scope of the present innovation.

Figure 1:
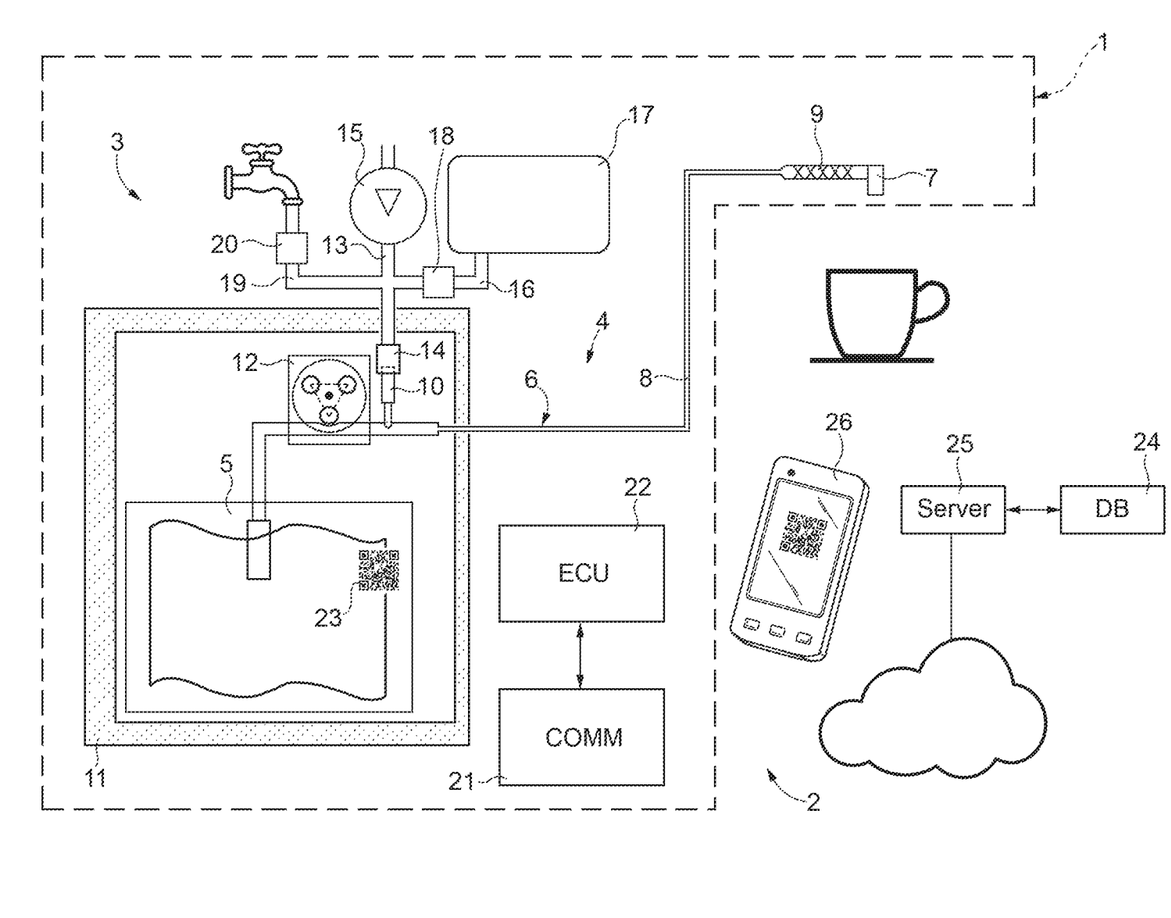

The attached FIGURE schematically shows an automatic beverage preparation machine or a beverage vending machine, generically referred to with reference numeral 1, capable of preparing and dispensing hot and cold beverages based on, or containing, liquid milk, and an electronic system, generically referred to with reference numeral 2, for remotely managing use of liquid milk as an ingredient in the preparation of hot and cold beverages based on, or containing, liquid milk in automatic beverage preparation machines and beverage vending machines 1.

As shown in the attached FIGURE, an automatic beverage preparation machine or a beverage vending machine 1, of which only the parts necessary for understanding the invention are shown, comprise:
- a brewer (not shown) designed to carry out either the same or different brewing processes for preparing either the same or different brewed beverages from either the same or different brewable substances contained in associated containers,
- a water supply circuit (not shown) configured to supply the brewer with hot and cold water for preparing brewed beverages, and
- a liquid milk supply circuit 3 configured to supply smooth and frothed, cold and hot liquid milk for preparing beverages mainly based on liquid milk or to be added to brewed beverages for preparing beverages containing liquid milk.

The liquid milk supply circuit 3 comprises a disposable liquid milk module 4 comprising:
- a disposable liquid milk container 5, conveniently of the bag-in-box type, containing liquid milk of any type, of natural origin, of artificial origin, of animal origin (cow, goat, sheep, donkey, buffalo, etc.), of vegetable origin, raw, fresh, pasteurised, whole, partially or totally skimmed, UHT, lactose-free, highly digestible, etc., and
- a disposable milk line 6 comprising:
  - a milk delivery nozzle 7 arranged in a beverage dispensing station, and
  - a flexible hose 8 to fluidically connect the disposable liquid milk container 5 to the milk delivery nozzle 7,
  - a static milk frother or foamer 9 arranged along the hose 8, conveniently immediately upstream of the milk delivery nozzle 7, and in which the liquid milk is frothed, and
  - a fluidic connector 10 arranged along the hose 8 to enable the introduction of air/steam/water into the disposable milk line 6.

The disposable milk line 6 may be manufactured integrally with the disposable liquid milk container 5 in such a way as to be undetachable from the latter.

Alternatively, the disposable milk line 6 may be manufactured separately from the disposable liquid milk container 5 so as to be successively either undetachably or detachably coupleable to the latter by means of a suitable connector.

Alternatively, only the hose 8 of the disposable milk line 6 may be manufactured integrally with the disposable liquid milk container 5 so as to be undetachable from the latter, whereas the milk delivery nozzle 7 and the static milk foamer 9 may be manufactured separately from the hose 8 so as to be successively either undetachably or detachably coupleable to the latter.

The liquid milk supply circuit 3 also comprises:
- a refrigerator 11 configured to contain the disposable liquid milk container 5 and to keep the liquid milk contained therein at a predetermined temperature of use,
- a milk pump 12, conveniently of the peristaltic type and preferably of the variable speed type, arranged either outside or, as in the example shown, inside the refrigerator 11, and configured to be coupled to, and to cooperate with, the hose 8 to suck the liquid milk out of the disposable liquid milk container 5. Preferably, the length of the hose 8 between the disposable liquid milk container 5 and the fluidic connector 10 is such that milk pump 12 may engage a stretch of the hose 8 upstream of the fluidic connector 10;
- an air line 13 to introduce a certain amount of air in the liquid milk flow in the hose 8. The air line 13 is equipped with a fluidic connector 14 designed to removably couple to the fluidic connector 10 of the disposable milk line 6 and, preferably, with an air pump 15 operable to introduce pressurised air into the milk;
- a steam line 16 to introduce a certain amount of steam produced by a steam generator 17 in the liquid milk flow in the hose 8 via a solenoid shutter valve 18. In the embodiment shown, the steam line 16 flows into the air line 13, between the air pump 15 and the fluidic connector 14. In a variant not shown, the steam line 16 is configured to introduce steam directly into the hose 8; and
- a water line 19 equipped with an solenoid shutter valve 20 and flowing into the air line 13, between the air pump 15 and the fluidic connector 14, to enable the disposable milk line 6 downstream of the milk pump 12 to be cleaned up at the end of each or more beverage production cycles or after a certain amount of time has passed.

The automatic beverage preparation machine or the beverage vending machine 1 further comprises:
- a communication interface 21 designed to support one or different wireless or wired short-range bidirectional communication technologies comprising one or more of the following: NFC technology; Bluetooth technology, for example, according to specification 4.0 and also known as Bluetooth Low Energy or Bluetooth Smart, which also provides an e-beacon feature that facilitates the pairing procedure; ZigBee technology; Wi-Fi technology, i.e., able to connect to a Wireless Local Area Network (WLAN); and USB (Universal Serial Bus) technology. The communication interface 21 may further optionally comprise one or different long-range communication technologies comprising one or more of the cellular communication technologies (2G, 3G, 4G, 5G) and the computer communication network technology based on a TCP/IP communication protocol, in particular Local Area Networks (LANs); and
- an electronic control unit 22 connected to, and configured to control operation of, the communication interface 21, to the milk pump 12, to the air pump 15, to the steam generator 17, and to the solenoid shutter valves 18, 20, during a production beverage production cycle.

The electronic system 1 for remotely managing use of liquid milk for the preparation of hot and cold beverages based on, or containing liquid milk comprises 23 tags to be associated with spare disposable components to be used to replace corresponding disposable components of a disposable milk module 4 that are detachably mutually coupled so as to be individually replaceable with respect to the other disposable components with which they are detachably coupled.

In the example shown in the attached FIGURE, if the disposable milk lines 6 are undetachably coupled with the disposable liquid milk containers 5, then a single tag 23 is associated with each spare disposable liquid milk container 5. Instead, if the disposable milk lines 6 are detachably coupled with the disposable liquid milk containers 5, then a tag 23 is associated with each spare disposable liquid milk container 5 and another tag 23 is associated with each spare disposable milk line 6.

Additional tags 23 may be associated with additional spare disposable components of the disposable milk module 4 that are individually replaceable after use, e.g., the static milk foamer 9 and/or the milk delivery nozzle 7.

A tag 23 associated with a spare disposable liquid milk container 5 contains or encodes at least the following information:
  a unique identification code (serial number) of the spare disposable liquid milk container 5,
  either the expiry or the use-by date and, conveniently, time of the liquid milk contained in the spare disposable liquid milk container 5,
  conveniently the capacity, in litres, of the spare disposable liquid milk container 5, and
  conveniently a security key appropriately computed based on the other data contained or encoded in the tag 23 and a proprietary algorithm to allow the data contained or encoded in the tag 23 to be subsequently validated.

In a preferred embodiment, a tag 23 associated with a spare disposable liquid milk container 5 also contains data indicative of how many disposable components of the disposable liquid milk module 4 are individually replaceable in the disposable liquid milk module 4 so as to allow determination of whether the individually replaceable disposable components comprise only the disposable liquid milk container 5, as it is integrated with, or undetachably coupled to, all the other disposable components, in particular the disposable milk line 6, or if, in addition to the disposable liquid milk container 5, which, therefore, is of a stand-alone type, there are other individually replaceable disposable components, in the example considered the disposable milk line 6 and possibly others.

A tag 23 associated with a spare disposable component other than a spare disposable liquid milk container 5 contains or encodes the following information:
  a unique identification code (serial number) for the spare disposable component, and
  a security key appropriately computed based on the unique identification code and a proprietary algorithm to allow the data contained or encoded in the tag 23 to be subsequently validated.

Tags 23 may be manufactured using any present or future technologies.

In a preferred embodiment, tags 23 are conveniently manufactured either in the form of adhesive labels to be applied to the spare disposable liquid milk containers 5 and to the spare disposable components, or in the form of labels to be printed directly on the spare disposable liquid milk containers 5 and on other spare disposable components.

In a different embodiment, tags 23 may be manufactured in the form of RFID tags.

A label may comprise one or more information fields in which the same unique identification code is encoded differently.

In a preferred embodiment, a label comprises at least one information field in which the unique identification code is displayed in the form of a barcode of any type.

In a preferred embodiment, the bar code is conveniently of the two-dimensional or matrix type, also known as a QR code, so as to be readable, i.e., scannable, by means of a scanner of a mobile operator terminal, and then decodable in order to obtain the information encoded therein comprising, in addition to the unique identification code and the above-mentioned information associated therewith, contact information as well, such as the Internet address (URL) needed to enable communication with a validation server.

In a different embodiment, the barcode could be of the linear type.

Optionally, the label may comprise an additional information field in which the unique identification code is also displayed in the form of a traditional sequence of alphanumeric characters of a certain length.

The electronic system 1 for remotely managing use of liquid milk for the preparation of hot and cold beverages based on, or containing, liquid milk further comprises:
  a database 24, with either a concentrated or a distributed architecture, in which information is stored to allow determination of whether spare disposable components meet the requisite requirements to replace corresponding disposable components that need to be replaced in automatic beverage preparation machines or beverage vending machines 1,
  a validation server 25, e.g., of the cloud type, with either concentrated or distributed architecture, located remotely relative to the automatic beverage preparation machines or beverage vending machines 1 and configured to access the database 24, which can be stored on, or separately from, the validation server 25, and, based on the information contained therein, to output notifications of consent or denial (refusal) to use the spare disposable components with which the tags 23 are associated in the automatic beverage preparation machines or the beverage vending machines 1; and
  one or more operator terminals 26, provided to operators authorised to supply automatic beverage preparation machines or beverage vending machines 1, and configured to communicate and cooperate with the validation server 25 and the automatic beverage preparation machines or beverage vending machines 1 to manage the use of the liquid milk contained in the disposable liquid milk containers 5 in the automatic beverage preparation machines or beverage vending machines 1 for the preparation of beverages based on, or containing, liquid milk in the automatic beverage preparation machines or beverage vending machines 1, in the manner described below in detail.

In one embodiment, the database 24 stores the list of all the unique identification codes of spare disposable liquid milk containers 5 and spare disposable milk lines 6 that are authorized by a supply manager of the automatic beverage preparation machines or beverage vending machines 1 to be used in these automatic beverage preparation machines or beverage vending machines 1, both those already used and those still available for use.

For the disposable liquid milk containers 5, in association with the corresponding unique identification codes applied, the database 24 also stores the expiry or the use-by dates and times of the liquid milk contained in the disposable liquid milk containers 5 to which the unique identification codes are associated to allow their expiry or use to be verified.

For the disposable liquid milk containers 5, in association with the corresponding unique identification codes applied, the capacity of the disposable liquid milk containers 5, to which the unique identification codes are associated, may also be optionally stored in the database 24 to allow a congruity verification to be carried out if necessary.

In a different embodiment, the database 24 stores only the unique identification codes applied to the disposable liquid milk containers 5 and disposable milk lines 6 that have already been supplied to automatic beverage preparation machines or beverage vending machines 1.

In the first embodiment, the database 24 need to be continuously updated by the liquid milk producer, or by either the manufacturer or the supply manager of the automatic beverage preparation machines or beverage vending machines 1. This first embodiment is more expensive than the second, but it guarantees a more effective control of the use of disposable liquid milk containers 5 and disposable milk lines 6 as the data is double checked.

In the second embodiment, on the other hand, the database 24 does not need to be constantly updated by the liquid milk producer, or by either the manufacturer or the supply manager of the automatic beverage preparation machines or beverage vending machines 1, but it is populated as the disposable liquid milk containers 5 and disposable milk lines 6 are supplied to the automatic beverage preparation machines or beverage vending machines 1. This second embodiment is more practical than the first and its management requires less attention.

In a preferred embodiment, the operator terminals 26 comprise mobile operator terminals in the form of electronic hand-held mobile smart communication devices, such as a smartphone, tablet, phablet, or personal computer, etc., configured to communicate with the automatic beverage preparation machines or beverage vending machines 1 to input settings that ensure the proper storage and proper use of the liquid milk contained in the disposable liquid milk containers 5.

For this purpose, the mobile operator terminals 26 are each equipped with:
- a communication interface designed to support one or different wireless or wired short-range bidirectional communication technologies comprising one or more of the following: NEC technology; Bluetooth technology, for example, according to specification 4.0 and also known as Bluetooth Low Energy or Bluetooth Smart, which also provides an e-beacon feature that facilitates the pairing procedure; ZigBee technology; Wi-Fi technology, i.e., able to connect to a Wireless Local Area Network (WLAN); and USB (Universal Serial Bus) technology. The communication interface further comprises, optionally, one or different long-range communication technologies comprising one or more of the cellular communication technologies (2G, 3G, 4G, 5G) and computer communication network technology based on a TCP/IP communication protocol, in particular Local Area Networks (LANs);
- a digital image capture device comprising one or more digital image sensors comprising one or more front cameras and one or more rear cameras;
- a tag reader, in the above-described preferred embodiment in the form of a QR code reader, which, as is known, is a software application (APP) designed to operate the camera of the mobile operator terminal 26, acquire and decode the QR codes framed by the camera to extract the information encoded therein, which usually comprise Internet addresses to which the mobile operator terminal 26 is automatically redirected so as to benefit from services or content; and
- a specific software application (APP) specifically developed to cause, when run, the mobile operator terminal 26 to provide an operator with a feature, hereinafter referred to as a "milk management feature" for short, that allows an operator to manage replacement of disposable liquid milk containers 5 and any other disposable components to be replaced in order to ensure the proper use and storage of the liquid milk contained in the disposable liquid milk containers 5, in the manner described below in detail.

For allowing disposable liquid milk containers 5 to be replaced, the APP is designed to cause, when run, the mobile operator terminal 26 to:
- expose, i.e., display on an electronic display, a graphical user interface ('GUI') designed to guide an operator through exploitation of the milk management feature,
- start a procedure to recognise its proximity to an automatic beverage preparation machine or a beverage vending machine 1,
- on recognising its proximity to an automatic beverage preparation machine or a beverage vending machine 1, activate the QR code reader and prompt the operator, via the graphical user interface, to frame a QR code associated with a spare disposable liquid milk container 5,
- capture and processes the framed QR code to extract the information contained therein, and
- automatically establish a communication between its long-range communication interface and that of the validation server 25 based on contact information extracted from the QR code and, when the communication is established, automatically transmit to the validation server 25 the other information extracted from the QR code, and, in particular, the unique identification code of the spare disposable liquid milk container 5, its capacity, the expiry or the use-by date and time of the liquid milk contained therein, and the security key, possibly also together with an identifier of the mobile operator terminal 26.

The proximity of a mobile operator terminal 26 to an automatic beverage preparation machine or a beverage vending machine 1 may be detected using any known proximity technology.

Conveniently, proximity may be recognised by attempting to establish a communication between the short-range communication interface of the mobile operator terminal 26 and that of the automatic beverage preparation machine or beverage vending machine 1, which communication could also involve a pairing procedure if the short-range communication technology used so provides, such as the Bluetooth one, thus recognising the proximity of the mobile operator terminal 26 to the automatic beverage preparation machine or beverage vending machine 1 when communication has been established.

In a different embodiment, the QR code reader of a mobile operator terminal 26 could be activated, instead of on recognising the proximity of the mobile operator terminal 26 to an automatic beverage preparation machine or a beverage vending machine 1, in response to a start command or gesture imparted by an operator on the graphical user interface of the mobile operator terminal 26.

Depending on the information encoded in the QR codes, the APP could be designed to perform additional initial operations.

In particular, if the QR codes associated with disposable liquid milk containers 5 encode the information of how many disposable components are individually replaceable in the disposable liquid milk modules 4, this information is immediately available at the mobile operator terminals 26 in response to QR code readings. If, on the other hand, the QR codes do not encode this information, the APP could be designed to obtain this information from another source or in another way, e.g., after the milk management feature has been launched, to cause the operators to be prompted to provide this information via the graphical user interfaces of the mobile operator terminals 26.

In addition, as will be described in more detail below, the APP is also designed to oblige the operators to scan the QR codes of all the spare disposable components to be used to replace corresponding disposable components in the disposable liquid milk modules 4.

In particular, if the QR codes encode the information that the disposable components to be individually replaced in the disposable liquid milk modules 4 comprise only the disposable liquid milk containers 5, as these are integral with or undetachably coupled to all the other disposable components, then the APP is designed to move on to the successive steps described below.

If, on the other hand, the QR codes encode the information that the disposable components to be individually replaced in the disposable liquid milk modules 4 comprise, in addition to the disposable liquid milk containers 5, additional disposable components—in the example considered, the disposable milk lines 6, as they are detachably coupled to the disposable liquid milk container 5—then the APP is designed to oblige the operator to scan also the QR codes of these additional spare disposable components before proceeding to the successive steps.

The validation server 25 is designed to:
receive and store information transmitted from the mobile operator terminals 26,
verify, in a way that is known and not described in detail, the validity of the data received using the security key received,
if the previous verification is positive, verify the validity of the unique identification codes and of the expiry or the use-by dates of the liquid milk received,
if the previous verifications are positive:
  disable the unique identification codes to avoid their being subsequently reused,
  compute the actual durations of use of the liquid milk contained in the spare disposable liquid milk containers 5, as described below,
  send to the mobile operator terminals 26 notifications of consent to use the spare disposable liquid milk containers 5 in the automatic beverage preparation machines or in the beverage vending machines 1, together with the actual durations of use of the liquid milk contained in the spare disposable liquid milk containers 5, which actual durations of use may be contained in specially structured consent notifications or may constitute, along with their sending, the consent notifications, and
if, on the other hand, one of the verifications is negative:
  send to the mobile operator terminals 26 notifications of denial to use the spare disposable liquid milk containers 5 in the automatic beverage preparation machines or beverage vending machines 1, and
  conveniently store in the database 24 the information that there have been attempts to supply spare disposable liquid milk containers 5 the automatic beverage preparation machines or beverage vending machines 1 that are unauthorised or for which the expiry or the use-by date of the liquid milk contained therein has already passed, possibly together with the identifiers of the mobile operator terminals 26 used to, or of the operators who have attempted to, supply the spare disposable liquid milk containers 5.

Verification of the validity of the received unique identification codes depends on the content of the database 24.

In the first embodiment described above, in which the database 24 contains the updated list of all the unique identification codes applied to spare disposable liquid milk containers 5 and to spare disposable milk lines 6 to allow the use of the liquid milk to be remotely managed, the verification of the validity of the received unique identification codes, both those that have already been used in automatic beverage preparation machines or in beverage vending machines 1 and those that are still available for use, comprises verifying whether these are in the database 2 and, if so, whether they are still available for use. If the received unique identification codes are in the database 24 and are still available for use, then their validity is recognised, otherwise denied.

In the second embodiment described above, where the database 24 only contains the unique identification codes applied to spare disposable liquid milk containers 5 and to spare disposable milk lines 6 that have already been used in automatic beverage preparation machines or beverage vending machines 1, verification of the validity of the received unique identification codes more simply comprises verifying whether or not the unique identification codes are in the database 24. If so, then their validity is recognised, otherwise denied.

Also the verification of the validity of the expiry or the use-by dates of the liquid milk received depends on the content of the database 24.

In the first embodiment, the validity verifications comprise verifying whether the received expiry or the use-by dates of the liquid milk correspond or not to those stored in the database 24 in association with the received unique identification codes. In the second embodiment, instead, the validity verifications comprise, more simply, verifying whether the received expiry or the use-by dates of the liquid milk have not already passed with respect to the current dates on which the validity verifications are carried out.

Finally, also the disabling of the unique identification codes depends on the contents of the database 24.

In the first embodiment, the disabling of the unique identification codes requires the storage of the information that the associated spare disposable liquid milk containers 5 have already been used in automatic beverage preparation machines or in beverage vending machines 1, and, therefore, are no longer available for further use. In the second embodiment, instead, the disabling of the unique identification codes requires, more simply, their storage in the database 24.

Computation of the actual durations of use of the liquid milk contained in the spare disposable liquid milk containers 5 depends primarily on the type of liquid milk contained in the disposable liquid milk containers 5, as different types of liquid milk have different expiry or use-by dates.

In a basic embodiment, the actual durations of use of the liquid milk may be simply computed as the durations up to the expiry of the liquid milk, based on, in particular, as the difference between, the expiry or the use-by dates and times of the liquid milk extracted from the QR codes and the current dates and times kept in the validation server 25, and conveniently expressed as hours of use of the liquid milk.

In a different, more sophisticated embodiment, the actual durations of use of the liquid milk could be, conveniently, computed not only based on the expiry or the use-by dates and times and the current ones, but also based on a proprietary criterion of the producer or supplier of liquid milk, or of the manufacturer or the operator of the automatic beverage preparation machines or beverage vending machines 1, to guarantee the correct use of the liquid milk in compliance with food safety regulations.

This criterion could conveniently take into account the bacterial proliferation in the liquid milk along the disposable milk lines 6 or in other disposable components of the disposable liquid milk modules 4 following the first use of the liquid milk, i.e., following the first delivery of a beverage based on, or containing, liquid milk contained in the disposable liquid milk containers 5 in the automatic beverage preparation machines or beverage vending machines 1.

In particular, in this preferred embodiment, the actual durations of use of the liquid milk are computed as follows:
  computing the maximum durations of use of the liquid milk as the durations up to the expiry of the liquid milk, based on, in particular, as a difference between, the expiry or the use-by dates and times of the liquid milk extracted from the QR codes and the current dates and times kept in the validation server 25, and conveniently expressed as hours of use of the liquid milk,
  comparing the maximum durations of use with one and the same or different durations of safety of the liquid milk, one for each type of liquid milk or the same for all types of liquid milk, each indicative of the time for which the liquid milk may be used after its first use before bacterial proliferation exceeds a safety limit, for example 72 hours, below which the bacterial proliferation is not dangerous for human health, while above which the bacterial proliferation could be dangerous for human health,
  if the maximum durations of use of the liquid milk are longer than the durations of safety of the liquid milk, then the actual durations of use of the liquid milk are set to the durations of safety of the liquid milk, and
  if the maximum durations of use of the liquid milk are shorter than the durations of safety of the liquid milk, then the actual durations of use of the liquid milk are set the maximum durations of use of the liquid milk.

In the latter situation, as the actual durations of use of the liquid milk could be relatively short, the electronic control units 22 of the automatic beverage preparation machines or beverage vending machines 1 could be programmed to cause the operators that supply the disposable liquid milk containers 5 to be warned of this fact via the displays of the automatic beverage preparation machines or the beverage vending machines 1, or via their mobile operator terminals 26, and to be asked to confirm how to proceed anyway.

In this embodiment, the durations of safety of the liquid milk are conveniently stored in the database 24 together with the expiry or the use-by dates and times of the liquid milk contained in the spare disposable liquid milk containers 5.

In a different embodiment, the durations of safety of the liquid milk could be encoded in the QR codes associated with the spare disposable liquid milk containers 5, so that they can be read by the operator terminals 26 at the same time as the expiry dates and times of the liquid milk.

In this embodiment, the actual durations of use of the liquid milk could be directly computed by the mobile operator terminals 26 based on the expiry dates and times of the liquid milk, and the durations of safety of the liquid milk extracted from the QR codes, and then sent by the mobile operator terminals 26 to the electronic control units 22 of the automatic beverage preparation machines or the beverage vending machines 1.

Alternatively, the durations of safety of the liquid milk could be sent from the validation server 25 to the electronic control units 22 together with the expiry dates and times of the liquid milk, which would then compute the actual durations of use based on the durations of safety of the liquid milk and on the expiry dates and times of the liquid milk received from the validation server 25.

In an additional embodiment, the durations of safety of the liquid milk could be stored by operators in the memories of the electronic control units 22 of the automatic beverage preparation machines or beverage vending machines 1, using the technical menus of the automatic beverage preparation machines or beverage vending machines 1 that are accessible via the graphical user interfaces of the automatic beverage preparation machines or beverage vending machines 1, or by using their mobile operator terminals 16.

In this latter embodiment, the mobile operator terminals 26 should be programmed to send the actual durations of use of the liquid milk to the electronic control units 22 of the automatic beverage, preparation machines or beverage, ending machines 1, so as to allow the electronic control units 22 to compare them with the actual durations of use of the liquid milk computed by the same electronic control units 22 based on the expiry dates and times of the liquid milk received from the mobile operator terminals 26 and on the durations of safety of the liquid milk stored in the memories of the same electronic control units 22.

As previously mentioned, if, in addition to the disposable liquid milk containers 5, it is also necessary to replace other disposable components of the disposable liquid milk modules 4, for example disposable milk lines 6, since they are detachably coupled to the disposable liquid milk container 5—information that is, as mentioned, either encoded directly into the QR codes associated with the disposable liquid milk containers 5 or obtained from other sources or otherwise, e.g., provided by operators via the graphical user interfaces of the mobile operator terminals 26—the APPS are also designed to cause, when run, for each of the disposable components to be replaced:
  the QR code readers of the mobile operator terminals 26 to be activated again and the operators to be prompted, via the graphical user interfaces, to frame the QR codes associated with the spare disposable components,
  the framed QR codes to be captured and processed in order to extract and send to the validation server 25 the information encoded therein, in particular the unique identification codes of the spare disposable components, and the security keys, possibly together with the identifiers of the mobile operator terminals 26.

The validation server 25 is further designed to:
receive and store information from the mobile operator terminals 26,
verify the validity of the received information via the security key,
if the previous verification is positive, verify the validity of the unique identification code received by accessing the database 24, in the same way as described above for the disposable liquid milk container 5;
if the previous verification is positive, disable the unique identification code to avoid its being subsequently reused, and send consent notifications to the mobile operator terminals 26 for the use of the spare disposable components in the automatic beverage preparation machines or beverage vending machines 1, and if verifications are negative, send denial notifications to the mobile operator terminals 26 for the use of the spare disposable components in the automatic beverage preparation machines or beverage vending machines 1, and conveniently store the information that there have been attempts to supply unauthorised spare disposable components into automatic beverage preparation machines or beverage vending machines 1, possibly together with the identifiers of the mobile operator terminals 16 used to, or the operators who have attempted to, supply spare disposable components.

In this respect, it is worth highlighting that the receipt of a denial notification regarding the use of a spare disposable component aborts the whole validation process, so that any successfully scanned spare disposable components must be re-enabled for subsequent use, including the disposable liquid milk container 5.

In an embodiment, no actual durations of use is computed for these other spare disposable components, since it is assumed that they have the same actual durations of use as those of the spare disposable liquid milk containers 5 to which they are supposed to be connected, so that their replacement takes place at the same time as that of the disposable liquid milk containers 5 to which they are supposed to be connected.

In a different embodiment, the validation server 25 is designed to compute and send to the mobile operator terminals 26, together with the consent notifications, actual durations of use for all the spare disposable components, in the same way as described above in relation to the disposable containers 5, so that the spare disposable components can be replaced individually and independently from the disposable liquid milk containers 5 to which they are supposed to be connected.

Finally, the APPs are designed, when run, to:
receive from the validation server 25 notifications of consent and denial to use the disposable liquid milk containers 5 and the other spare disposable components, if any, and, together with the consent notifications, the associated actual durations of use of the disposable liquid milk containers 5 and, where different, of the other spare disposable components;

if consent notifications are received for all the spare disposable components, notify the electronic control units 22 of the automatic beverage preparation machines or beverage vending machines 1 of the consents to use the disposable liquid milk modules 4 containing the spare disposable components, for which the consent notifications have been received from the validation server 25, by transmitting the associated actual durations of use, if different for the various disposable components, or the actual durations of use of the disposable liquid milk containers 5, if the actual durations of use of the other spare disposable components are the same as those of the disposable liquid milk containers 5; and if denial notifications are received for spare disposable components, notify the electronic control units 22 of the automatic beverage preparation machines or beverage vending machines 1 of the denial to use the spare disposable liquid milk modules 4 containing the spare disposable components for which the denial notifications have been received from the validation server 25, without transmitting any actual durations of use.

In addition to data indicative of the actual durations of use, APPS may be designed to, when run, transmit to the electronic control units 22 information relating to the capacity of the spare disposable liquid milk containers 5.

The electronic control units 22 of the automatic beverage preparation machines or beverage vending machines 1 are programmed to:
receive, via their short-range communication interfaces, the actual durations of use of the spare disposable components from the mobile operator terminals 26, and
control operation of the automatic beverage preparation machines or beverage vending machines 1 based on the received actual durations of use.

In particular, the electronic control units 22 of the automatic beverage preparation machines or beverage vending machines 1 are programmed to:
if the actual durations of use for the spare disposable components are received from the mobile operator terminals 26, allow beverages based on, or containing, liquid milk to be selection and, consequently, prepared and dispensed for periods of time corresponding to the actual durations of use received from the mobile operator terminals 26, and starting from the first use of the liquid milk, i.e., from the dispensing of the first beverages prepared using the liquid milk contained in the spare disposable liquid milk containers 5, after which beverages based on, or containing, liquid milk are prevented from being selectable and, therefore, prepared and dispensed, until the disposable liquid milk containers 5 and/or the disposable components for which the relevant durations of use have elapsed are replaced, and if the actual durations of use for the spare disposable components are not received from the mobile operator terminals 26, continue to prevent beverages based on, or containing, liquid milk from being selectable and, consequently, prepared and dispensed, until the actual durations of use are received for all the spare disposable components to be used.

The electronic control units 22 of the automatic beverage preparation machines or beverage vending machines 1 may also be programmed to cause, when the mobile operator terminals 26 recognise that they are in the vicinity of the automatic beverage preparation machines or beverage vending machines 1, for example, if Bluetooth communication technology is used, in response to the pairing of the short-range communication interfaces of the mobile operator terminals 26 with those of automatic beverage preparation machines or beverage vending machines 1, a series of information to be displayed on the displays of the mobile operator terminals 26, and possibly also on those of the automatic beverage preparation machines or beverage vending machines 1. The displayed information includes the operating state of the automatic beverage preparation machines or beverage vending machines 1, whether the actual durations of use of the liquid milk have elapsed or, if not, how many hours are left until they expire, how many selections of milk have been made, and other data, if considered important.

The use of the number of hours of use of the liquid milk contained in the disposable liquid milk containers 5 in the automatic beverage preparation machines or beverage vending machines 1 for the preparation of beverages based on, or containing, liquid milk, instead of the expiry or the use-by date and time of the liquid milk contained in the disposable liquid milk container 5, prevents possible attempts at fraud in the sale of liquid milk involving the fraudulent extension of the expiry time period. The latter can be done, for example, by altering the current date and time of the automatic beverage preparation machines or beverage vending machines 1, so that disposable liquid milk containers are accepted as valid when their expiry dates have already passed.

The automatic beverage preparation machines or beverage vending machines 1 are in fact programmed to downcount the hours for which the liquid milk may be used for the preparation of beverages, regardless of the current date and time of the automatic beverage preparation machines or beverage vending machines 1.

If the applications of the automatic beverage preparation machines or beverage vending machines 1 enable it, the prevention of possible attempts at fraud in the sale of liquid milk could be additionally strengthened by storing, in the automatic beverage preparation machines or beverage vending machines 1 at the time of their installation, an initial configuration specifying how many disposable components of the disposable liquid milk modules 4 are to be replaced, so that the electronic control units 22 of the automatic beverage preparation machines or the beverage vending machines 1 can then be programmed to verify that they receive from the mobile operator terminals 26, which must consequently be programmed to transmit them, the actual durations of use for all the disposable components of the disposable liquid milk modules 4 to be replaced.

This avoids possible attempts at fraud in the sale of liquid milk by the operators by indicating, via the graphical user interfaces of the mobile operator terminals 26, that in the disposable liquid milk modules 4 only certain disposable components have to be replaced, specifically the disposable liquid milk containers 5, when in reality more than one disposable component needs to be replaced, for example the disposable liquid milk containers 5 and the disposable milk lines 6. This ensures that the APPs enable the automatic beverage preparation machines or beverage vending machines 1 to dispense beverages based on, or containing, liquid milk in response to receiving from the validation server 25 the actual durations of use for the spare disposable liquid milk containers 5, instead of the actual durations of use for all the spare disposable components, thus allowing the replacement of the disposable liquid milk containers 5 alone and not the disposable milk lines 6 as well.

In an embodiment particularly suitable for applications where automatic beverage preparation machines or beverage vending machines 1 are installed in places where there is no cellular coverage which enables mobile operator terminals 26 to communicate with the validation server 25, or even just for the convenience of the supply manager of the automatic beverage preparation machines or beverage vending machines 1, scanning of the OR codes on the spare disposable liquid milk containers 5 and on other spare disposable components, and their validation with the validation server 25, could be performed offline, namely, instead of when the automatic beverage preparation machines or beverage vending machines 1 are actually replenished, as in the above-described embodiments, well before their replenishment, for example even in the operator's warehouse, where spare disposable liquid milk containers 5 and the other spare disposable components are stored, or when the spare disposable liquid milk containers 5 and the other spare disposable components are loaded on the transport means used to transport the spare disposable liquid milk containers 5 and the other spare disposable components.

In this embodiment, therefore, the APPs should be programmed to store in the mobile operator terminals 26 the consent notifications received from the validation server 25 and the actual durations of use, and then to transmit them to the automatic beverage preparation machines or beverage vending machines 1 when they are replenished.

In this embodiment, the APPs could also be programmed to request a new scan of the QR codes of the disposable components in order to store the association between the unique identification codes of the disposable components and the unique identification codes of the automatic beverage preparation machines or beverage vending machines 1 for statistical purposes.

In an alternative embodiment, the operator terminals 26 may also comprise stationary operator terminals, for example, consisting of traditional, pistol-type QR code scanners connected to personal computers in the warehouses where the spare disposable components are stored and storing consent notifications and the actual durations of use received from the validation server 25, which can then be transferred to the automatic beverage preparation machines or beverage vending machines 1 via known technologies, for example by means of non-transitory, computer-readable tangible storage media, such as USB sticks.

This embodiment makes it possible to avoid having to supply operators in charge of replenishing the automatic beverage preparation machines or beverage vending machines 1 with mobile operator terminals 26 to scan the QR codes on the spare disposable liquid milk containers 5 and on the other disposable components, and validate them with the validation server 25. This also allows QR codes to be read and validated, instead of by the operators, by the warehouse workers when the transport means are loaded in the warehouse.

The invention claimed is:

1. An electronic system to remotely enable and locally control use of liquid milk in preparation of beverages based on, or containing, liquid milk in an automatic beverage preparation machine or an automatic beverage vending machine;

the automatic beverage preparation machine or the beverage vending machine comprises disposable liquid milk modules comprising one or more disposable components couplable to other disposable components either detachably, so as to be individually replaceable apart from other disposable components, or undetachably, so as to be replaceable together with the other disposable components;

the disposable components comprise disposable liquid milk containers and disposable milk lines configured to fluidically connect the disposable liquid milk containers to liquid milk delivery nozzles;

the electronic system comprising:

tags to be associated with disposable spare components usable in the automatic beverage preparation machine or in the automatic beverage vending machine to replace corresponding disposable components that need to be replaced, and storing unique identification data of the associated disposable components and, for disposable liquid milk containers, data indicative of either the expiry date or the use-by date of the liquid milk contained therein;

a database configured to store data that allows to determine whether the disposable spare components meet requisite requirements for replacing corresponding disposable components that need to be replaced in the automatic beverage preparation machine or in the beverage vending machine, the stored data comprising unique identification data of the disposable spare components, both those already used and those available for use, that are authorized to be used in the automatic beverage preparation machine or in the automatic beverage vending machine;

a validation server configured to determine, based on the data stored in the tags, whether the associated disposable spare components meet requisite requirements for replacing corresponding disposable components that need to be replaced in the automatic beverage preparation machine or in the automatic beverage vending machine, and to output corresponding consent or denial notices for the use of the disposable spare components; and one or more operator terminals provided to operators authorized to supply the automatic beverage preparation machine or the automatic beverage vending machine, and configured to communicate and cooperate with the validation server and with the automatic beverage preparation machine or the automatic beverage vending machine to allow replacement of disposable components in the automatic beverage preparation machine or in the automatic beverage vending machine with corresponding disposable spare components to be managed;

the one or more operator terminals are configured to:
read tags associated with the disposable spare components;
communicate with the validation server to send the data read from the tags to the validation server and to receive from the validation server notices of consent or denial to use the associated disposable spare components in the automatic beverage preparation machine or in the automatic beverage vending machine;
determine, based on the consent or denial notices received from the validation server, whether the disposable spare components with which read tags are associated, are usable in the automatic beverage preparation machine or the automatic beverage vending machine to replace corresponding disposable components that need to be replaced; and
if the disposable spare components are determined to be usable in the automatic beverage preparation machine or in the automatic beverage vending machine for replacing corresponding disposable components that need to be replaced, send the automatic beverage preparation machine or the automatic beverage vending machine data indicative of durations of use of the disposable spare components in the automatic beverage preparation machine or in the automatic beverage vending machine;

the validation server is further configured to:
receive data from the one or more operator terminals;
validate the unique identification data of the disposable spare components and, for disposable liquid milk containers, either the expiry date or the use-by date of the liquid milk contained therein based on data contained in the database;
generate notices of consent or denial to use disposable components in the automatic beverage preparation machine or in the automatic beverage vending machine based on the outcome of the validations; and
communicate with the one or more operator terminals to send the generated consent or denial notices to the one or more operator terminals;

at least one of the validation server or the operator terminals is further configured to:
compute the durations of use of the disposable spare components in the automatic beverage preparation machine or in the beverage vending machine based on at least one of the expiry dates, the use-by dates, the expiry hours, or the use-by hours of the liquid milk stored in the tags associated with the disposable liquid milk containers and at least one of a current date or hour kept by either the validation server or the operator terminals,
when the durations of use are computed by the validation server, the validation server is further configured to communicate with the operator terminals to send data indicative of the computed durations of use to the operator terminals;

the automatic beverage preparation machine or the automatic beverage vending machine is configured to:
receive data indicative of the computed durations of use of the disposable spare components from the one or more operator terminals; and
enable use of the disposable spare components for the corresponding received durations of use in the preparation and delivery of beverages based on, or containing, liquid milk.

2. The electronic system of claim 1, wherein at least the validation server is configured to:
compute the durations of use of the disposable spare components in the automatic beverage preparation machine or in the beverage vending machine; and
communicate with the one or more operator terminals to send data indicative of the computed durations of use to the one or more operator terminals.

3. The electronic system of claim 1, wherein at least the one or more operator terminals are further configured to:
compute the durations of use of the disposable spare components in the automatic beverage preparation machine or in the beverage vending machine.

4. The electronic system of claim 1, wherein the durations of use of disposable spare components in the automatic beverage preparation machine or in the automatic beverage vending machine are further computed based on a criterion designed to guarantee a correct use of the liquid milk in compliance with food safety regulations.

5. The electronic system of claim 1, wherein the tags comprise QR codes printed either on adhesive labels to be applied to disposable spare components or directly on disposable spare components.

6. The electronic system of claim 1, wherein the tags to be associated with disposable liquid milk containers further store data indicative of the number of disposable components that are to be replaced in the disposable liquid milk modules together with the disposable liquid milk containers.

7. The electronic system of claim 6, wherein the one or more operator terminals are further configured to:
in response to reading the data contained in the tags associated with the disposable spare liquid milk containers and based on the data read from the tags, determine the number of disposable spare components to be used in the disposable liquid milk modules together with the disposable spare liquid milk containers;
prompt the operators, through the graphical user interfaces of the one or more operator terminals, to read the tags associated with the other disposable spare components to be used in the disposable liquid milk modules together with the disposable liquid milk containers; and read the tags and send the read data to the validation server.

8. The electronic system of claim 1, wherein the one or more operator terminals comprise mobile operator terminals configured to communicate with:

the validation server through one or more long-range bidirectional communication technologies to receive the notices of consent or denial to use disposable spare components and, when computed by the validation server, the associated durations of use; and the automatic beverage preparation machines or the beverage vending machines through one or more short-range bidirectional communication technologies to send data indicative of the durations of use of disposable spare components to the automatic beverage preparation machines or the beverage vending machines.

9. The electronic system of claim 8, wherein the mobile operator terminals are further configured to:

sense their proximity to the automatic beverage preparation machines or the beverage vending machines;

in response to sensing their proximity to the automatic beverage preparation machines or the beverage vending machines, operate their own tag readers and prompt the operators, through their own graphical user interfaces, to read the tags associated with disposable spare components; and read the tags and send the read data to the validation server.

10. The electronic system of claim 1, wherein the one or more operator terminals comprise stationary operator terminals comprising tag readers connected to processing terminals configured to communicate with the validation server through one or more long-range bidirectional communication technologies to receive from the validation server notices of consent or denial to use disposable spare components in automatic beverage preparation machines or in beverage vending machines and, when computed by the validation server, durations of use of disposable spare components in automatic beverage preparation machines or in beverage vending machines;

non-transitory computer-readable tangible storage media are provided to transfer data indicative of durations of use of disposable spare components to automatic beverage preparation machines or beverage vending machines.

11. The electronic system of claim 1, wherein the database is configured to store, for disposable spare liquid milk containers, at least one of the expiry date, the use-by date, the expiry hours, or the use-by hours of the liquid milk contained therein.

12. Non-transitory computer-readable software loadable in the one or more operator terminals and in the validation server of the electronic system of claim 1 and having stored thereon or embodied therein software instructions that, when executed by the one or more operator terminals and the validation server, cause the one or more operator terminals and the validation server to become configured to cooperate in implementing the electronic system of claim 1.

13. The electronic system of claim 4, wherein the durations of use of disposable spare components in the automatic beverage preparation machine or in the automatic beverage vending machine are further computed based on the criterion designed to guarantee the correct use of the liquid milk in compliance with the food safety regulations by:

computing maximum durations of use as the durations up to the expiry of the liquid milk as a difference between the expiry dates and the use-by dates or between the expiry hours and the use-by dates hours of the liquid milk read from the tags and the current data and/or time;

comparing the maximum durations of use with either one and the same or different durations of safety of the liquid milk, either one for each type of liquid milk or the same for all types of liquid milk, each indicative of the time for which the liquid milk may be used after its first use before bacterial proliferation exceeds a safety limit, below which the bacterial proliferation is not dangerous for human health, while above which the bacterial proliferation could be dangerous for human health;

if the maximum durations of use of the liquid milk are longer than the durations of safety of the liquid milk, the actual durations of use of the liquid milk are set to the durations of safety of the liquid milk;

if the maximum durations of use of the liquid milk are shorter than the durations of safety of the liquid milk, the actual durations of use of the liquid milk are set to the maximum durations of use of the liquid milk.

* * * * *